Oct. 26, 1971  A. D. AGNELLINO  3,614,952
HYDROTHERAPEUTIC BATHTUB

Filed Feb. 16, 1970

INVENTOR
ANTHONY D. AGNELLINO
BY
*Sommers & Sommers*
ATTORNEYS

INVENTOR
ANTHONY D. AGNELLINO
BY
Sommers & Sommers
ATTORNEYS

United States Patent Office 3,614,952
Patented Oct. 26, 1971

3,614,952
HYDROTHERAPEUTIC BATHTUB
Anthony Dale Agnellino, 465 Monmouth Road,
West Long Branch, N.J. 07764
Filed Feb. 16, 1970, Ser. No. 11,751
Int. Cl. A61h 9/00
U.S. Cl. 128—66                    4 Claims

ABSTRACT OF THE DISCLOSURE

An elongated hydrotherapeutic tub with bottom, rear, front and connecting side wall portions of predetermined complementary configurations, to incline a body of water introduced into the bathtub toward the front end wall, and a recirculation assembly wholly mounted on the outside of the front end wall of the bathtub, including jet-projecting straight portions of said recirculation assembly mounted through said front wall of the bathtub and wholly mounted on and replaceable from said front end of the bathtub, below the normal level of said body of water and extending coaxially with the longitudinal axis of the bathtub and of said body of water, whereby recirculating streams of water may thus be projected through the body of water and toward the rear wall of said bathtub, upsetting the level and equilibrium of said body of water and agitating the body of water, with beneficial axial hydrotherapeutic action along the user's body.

HYDROTHERAPEUTIC BATHTUB

Figure 1:
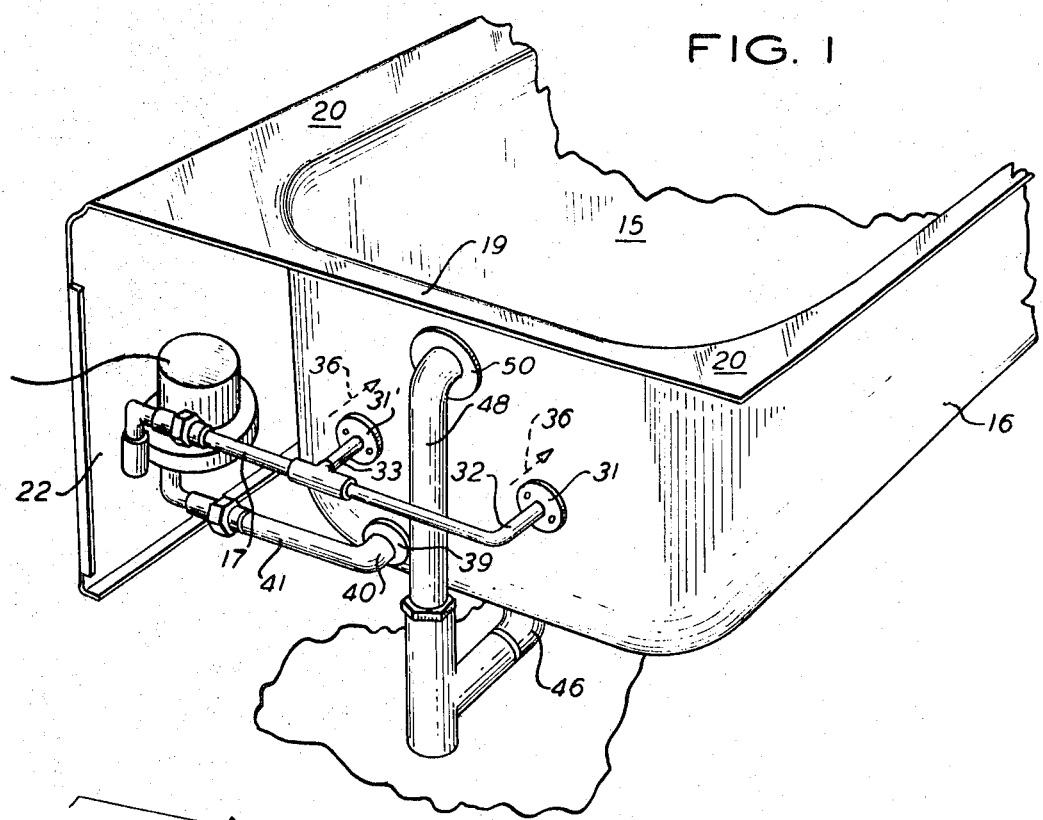

This invention relates to a hydrotherapeutic bathtub. Heretofore hydrotherapeutic bathtubs have been provided with means for recirculating the water therein through complicated procedures, usually including the discharge of the recirculated water into the bathtub through nozzles disposed at opposite sides of the tub, neutralizing and dissipating any movement of the recirculated water. The limited transverse dimensions of the tub, further dissipated the force of the recirculated water. Such recirculation has usually required piping carried along the sides of the tub, rendering the tasks of installation, inspection, repair and replacement of parts difficult, complex, costly, and inefficient.

In view of the foregoing and other disadvantages of prior devices, it was generally deemed necessary to aerate the water, for attempted hydrotherapeutic action. Aeration involves additional, complex piping and valving mechanisms intended to introduce air bubbles into the body of water.

I have discovered that a beneficial hydrotherapeutic bathtub apparatus may be made, as disclosed herein, without the use of complex mechanisms.

Pursuant to my invention, the body of water is recirculated and agitated by straight line jets directed axially in the tub from the front end thereof, the tub in turn being so designed as to incline the body of water downwardly and forwardly and against the front end of the tub. To this end a novel recirculating assembly is mounted wholly at the front end of the tub and cooperates with said predetermined form of the bathtub so that jets of recirculated water will be projected axially through the body of water in straight lines through the front end of the tub toward the rear end of the tub.

Figure 2:
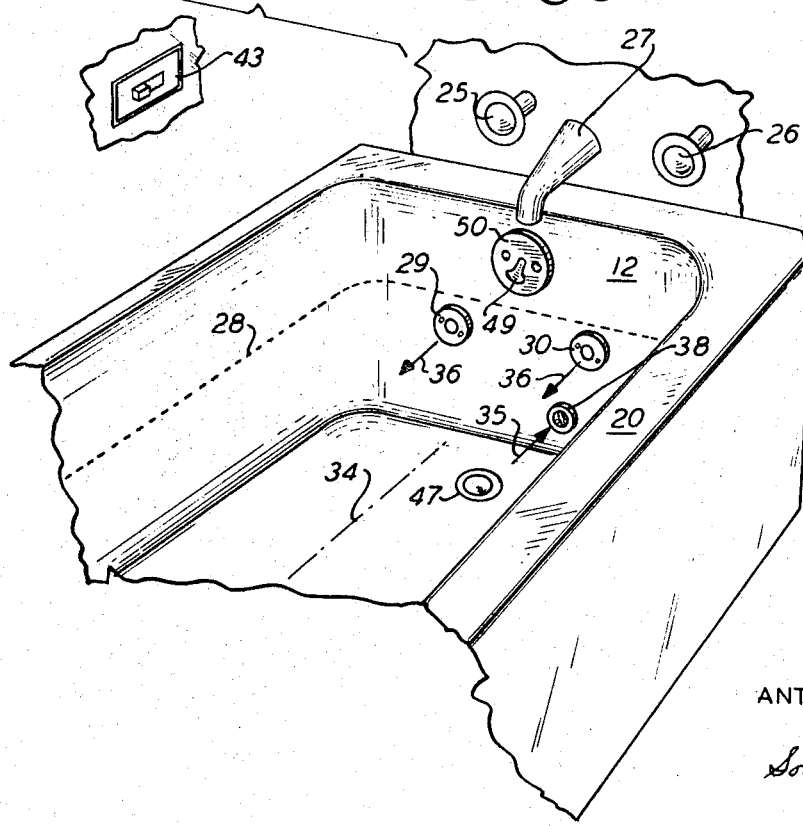
Figure 3:
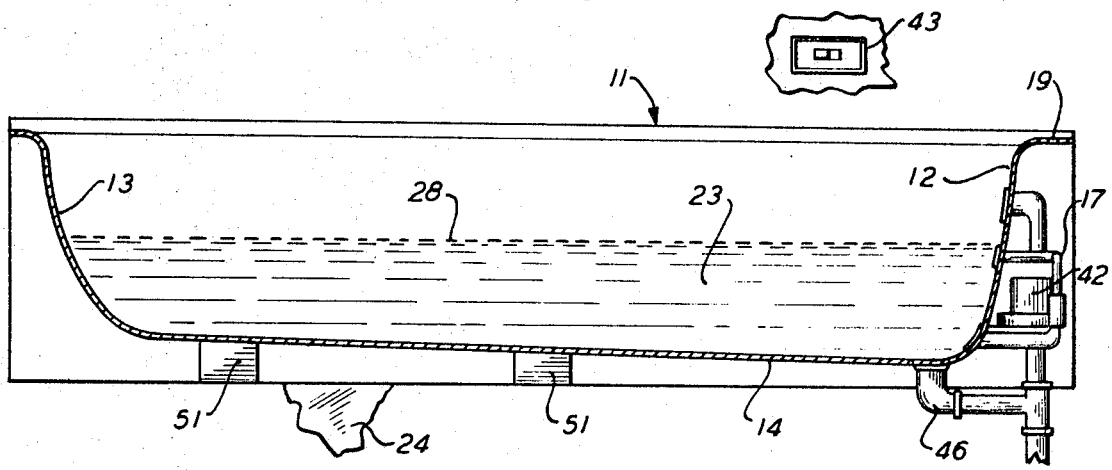
Figure 4:
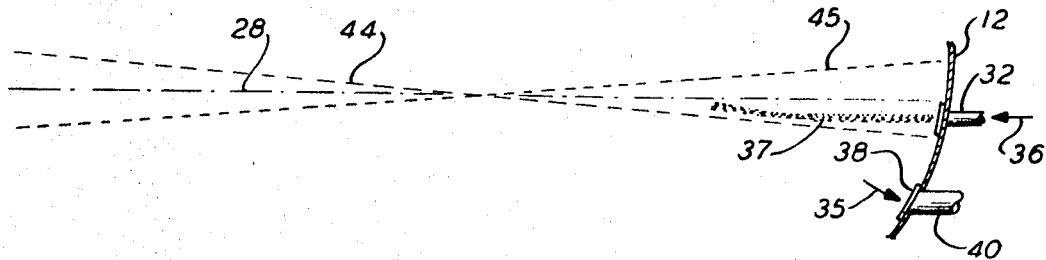

In the drawings, wherein similar reference characters indicate like parts:

FIG. 1 is a fragmentary perspective view of a hydrotherapeutic bathtub embodying the invention, taken from the front end thereof, showing the novel water recirculating assembly completely connected to said end, FIG. 2 is a fragmentary perspective view thereof, taken from about the center of the tub, and looking toward said front end thereof, FIG. 3 is a medial, longitudinal, elevational view, partly sectional, of said bathtub and complete water recirculating assembly shown connected to said front end thereof and disposed within a recessed outer area at said end, and FIG. 4 is a schematic view, illustrating the novel recirculation-agitation procedure achieved pursuant to the invention.

The hydrotherapeutic bathtub device 11 of this invention comprises front and rear wall members 12 and 13 and a bottom wall member 14 and side wall members 15 and 16, connecting the front and rear wall members and defining therewith an upwardly opening hydrotherapeutic bathtub. The water flow recirculating assembly 17 is positioned in a recessed area (FIG. 3) at the front end of the bathtub defined by the outwardly directed marginal flange 19 and front wall 12 of the hydrotherapeutic bathtub. The side wall members 15 and 16 may be marginally extended as at 20 (FIG. 1) and downturned as at 22.

Rear wall 13 is (FIG. 3) forwardly, downwardly inclined toward the bottom wall 14, the latter being correspondingly downwardly forwardly inclined toward the front wall 12, so that the body of water 23 in the bathtub will tend to move toward the front wall. The hydrotherapeutic bathtub 11 may be positioned on the floor 24 or other supporting means and may (FIG. 3) have intermediate spacing or supporting fixtures 51.

Water may be initially introduced into the bathtub through (FIG. 2) hot and cold water valves 25, 26 or through a mixing faucet from a water supply source, and thence through the preferably mixing faucet 27 and into the tub. The tub may be thus filled with water to predetermined desired level 28 (FIG. 2) above the recirculating discharge ports 29 and 30 mounted in the front wall 12 of the tub in registration with apertures therein; complementary inner and outer brackets or plates 29, 30, 31, 31', seal straight sections 32, 33 (FIG. 1) of the water recirculating piping 17 assembly to the front wall 12 of the tub in line with the longitudinal axis 34 (FIG. 2) of the tub to assemble the parts as above described and shown in the drawings. The end sections 32, 33 of the water recirculated piping 17 are disposed parallel to the longitudinal axis 34 of the bathtub and body of water 23 (FIG. 2). Water is withdrawn for recirculation, as indicated by the arrow 35 (FIG. 1) through the outlet piping 40 connected to pump 42 (FIG. 3) said piping being disposed below the inlet jets 29 and 30, said outlet piping being sealed as by bracket or plate 38 to the front wall of the tub.

In operation, after filling the tub to the desired level 28, the water source is turned off, and then the tub may be actuated by switch and timing means as desired—for example, switch 43, to control the water recirculation cycle.

The front wall of the tub is contoured (FIG. 3) substantially perpendicularly to the bottom wall 14 of the tub, and slightly inclined at the juncture therewith toward the rear wall 13 of the tub. The latter is angularly inclined downwardly forwardly appreciably and joins the (high end) rear end of the bottom wall of the tub, as shown in FIG. 3 so that, in cooperation with the downwardly forwardly angled bottom wall 14 of the bathtub, the body of water will be inclined toward and will tend to move against the front wall 12 and to return to that position if equilibrium is disrupted. This phenomenon is a feature of the invention, pursuant to which the body of water may be agitated or imbalanced by the recirculation procedure, thus upsetting the tendency of the body of water to press against the front wall of the tub. The end sections 32, 33 of the water recirculating piping are (FIG. 1) disposed parallel to the longitudinal axis 34 of the bathtub; recirculation water pumped through the piping 17 and end sections 32, 33 will be directed in straight line streams of water 36, 37 (FIG. 4) passing rearwardly through the tub and through the body of water in a direction opposite the tendency of stress and motion of the body of water, agitating the water body along the user's body, for hydrotherapeutic action and upsetting the normal level 28 thereof. This action agitates the body of water axially and tends to lift the body of water toward the rear wall of 13 as indicated at 44 (FIG. 4), and, in reaction thereto, the tendency of the body of water is to move oppositely toward the opposite line indicated at 45 (FIG. 4) and return to normal level 28.

The invention is designed as a hydrotherapeutic bathtub; the described features of agitation of the water are important features of the invention. The hydrotherapeutic bathtub of this invention thus effectuates agitation of the water, with hydrotherapeutic action in the body of water along longitudinal axis 34 and along the user, in an efficient and highly reliable manner, and without, as in the prior art, requiring complex and costly structures, such as air jets and aerating valves. The structure of this invention is relatively sturdy, efficient and durable in use and operation.

The bathtub may be drained through drain piping 46 (FIG. 3) and closure plate 47 (FIG. 2) which may be conveniently controlled by the user at the front of the tub through suitable connected means such as valve 49.

The inlet jet plates 29 and 30 may have complementary engagement with the brackets 31, 31'; valve 49 may be operated through cover plate 50.

It will be noted from the above description that recirculation system 17 and drain valve mechanism are secured to the outside of the front wall 12. All of the described assembly parts may be conveniently installed at the factory or other point of installation and may be inspected, repaired or replaced conveniently from front end 12 of the bathtub (FIG. 1) or delivered to the builder or user as a complete assembly so that only the connection of the drain piping 46 and the control switch means 43 would be required. If it is desired to disconnect the entire assembly for repair or replacement this may conveniently be done at that (front) end of the bathtub.

I claim:

1. A hydrotherapeutic bathtub comprising front and rear wall members and a bottom member and side wall members connecting said front and rear wall members and defining therewith an upwardly opening bathtub, said bottom wall inclined downwardly from the rear wall to the front wall, thereby inclining the body of water in the direction of the front wall, a water flow and recirculating assembly, comprising a pump, outlet piping connected with said pump at one end and with said front wall member, and inlet piping connected with said pump at one end and at the other end with an inlet aperture provided in said front wall member above said outlet piping aperture, said inlet piping comprising jet-projecting straight portions of piping disposed co-axially with the longitudinal axis of the bathtub, and a drain aperture provided in said bathtub at said front wall thereof, whereby the tub may be filled with a body of water to a predetermined level, and said water may be withdrawn through said outlet assembly and through the pump and recirculated through the inlet assembly and projected in a path parallel to the length of the bathtub and medially of bathtub, thereby agitating the body of water along the user's body and limbs for hydrotherapeutic action.

2. In a hydrotherapeutic bathtub as described in claim 1, said front wall having an outwardly directed marginal flange at the upper edge thereof defining, with the front wall, a recessed area for containing and positioning said water flow and recirculating assembly therein and facilitating removal thereof from said front end of the bathtub.

3. In a hydrotherapeutic bathtub as described in claim 1, said rear wall being downwardly forwardly inclined, cooperating with the downwardly, forwardly inclined bottom wall and the stream of water projected medially axially in the bathtub through the inlet assembly to agitate the water in the bathtub.

4. In a hydrotherapeutic bathtub as described in claim 1, said inlet piping being so connected with an inlet aperture at the front wall of the tub, in a plane parallel to the longitudinal axis of said bathtub so as to project a stream of water through said inlet aperture toward said rear wall of the bathtub in a line medially axially of the bathtub.

References Cited

UNITED STATES PATENTS

| | | | |
|---|---|---|---|
| 3,302,640 | 2/1967 | Jacuzzi | 128—66 |
| 3,263,678 | 8/1966 | Everston | 128—66 |

L. W. TRAPP, Primary Examiner

U.S. Cl. X.R.

4—178